United States Patent
Garland et al.

(10) Patent No.: US 10,830,220 B2
(45) Date of Patent: Nov. 10, 2020

(54) HIGH PRESSURE FUEL PUMP

(71) Applicant: DELPHI TECHNOLOGIES IP LIMITED, St. Michael (BB)

(72) Inventors: Paul F. Garland, Kent (GB); Toby Pedley, London (GB); Matthew Fairbairn, Kent (GB)

(73) Assignee: DELPHI TECHNOLOGIES IP LIMITED (BB)

( * ) Notice: Subject to any disclaimer, the term of this patent is extended or adjusted under 35 U.S.C. 154(b) by 96 days.

(21) Appl. No.: 16/096,976

(22) PCT Filed: Apr. 20, 2017

(86) PCT No.: PCT/EP2017/059417
§ 371 (c)(1),
(2) Date: Oct. 26, 2018

(87) PCT Pub. No.: WO2017/186572
PCT Pub. Date: Nov. 2, 2017

(65) Prior Publication Data
US 2019/0113032 A1    Apr. 18, 2019

(30) Foreign Application Priority Data
Apr. 27, 2016  (GB) .................. 1607312.4

(51) Int. Cl.
*F04B 1/0408* (2020.01)
*F04B 1/124* (2020.01)
*F16J 1/00* (2006.01)
*F02M 59/02* (2006.01)
*F02M 59/44* (2006.01)
(Continued)

(52) U.S. Cl.
CPC ........... *F04B 1/0408* (2013.01); *F02M 59/02* (2013.01); *F04B 1/124* (2013.01); *F16J 1/006* (2013.01); *F02M 59/445* (2013.01); *F04B 7/0266* (2013.01); *F04B 53/143* (2013.01)

(58) Field of Classification Search
CPC ......... F04B 1/124; F04B 1/0408; F16J 1/006; F02M 59/02
See application file for complete search history.

(56) References Cited

U.S. PATENT DOCUMENTS 5,540,570 A * 7/1996 Schuller ................ B60T 8/4031
                                                              417/545
6,250,206 B1   6/2001 Johnson
(Continued)

FOREIGN PATENT DOCUMENTS

DE   102008041176 A1   2/2010
DE   102013207682 A1   10/2014
(Continued)

*Primary Examiner* — Peter J Bertheaud
(74) *Attorney, Agent, or Firm* — Joshua M. Haines

(57) ABSTRACT

A high pressure fuel pump includes a pumping head and a plunger slidably adjusted in a bore. The plunger is provided with a blind bore defining a chamber open in the head end of the plunger and in fluid communication with the compression chamber, the end face of the plunger being limited to a peripheral annular face surrounding the opening, the bore further defining a peripheral cylindrical wall and a bottom face. A filler member is arranged inside the chamber.

7 Claims, 3 Drawing Sheets

(51) Int. Cl.
   *F04B 7/02*   (2006.01)
   *F04B 53/14*  (2006.01)

(56) References Cited

U.S. PATENT DOCUMENTS

| | | | | |
|---|---|---|---|---|
| 6,457,957 | B1 * | 10/2002 | Bauer | F04B 1/0408 |
| | | | | 417/562 |
| 6,764,286 | B2 * | 7/2004 | Hunnicutt | B60T 8/4031 |
| | | | | 137/859 |
| 7,827,961 | B2 * | 11/2010 | Cooke | F02M 43/02 |
| | | | | 123/446 |
| 8,757,047 | B2 * | 6/2014 | Benson | F02M 59/442 |
| | | | | 277/411 |
| 2008/0069712 | A1 * | 3/2008 | Mennicken | F04B 53/1022 |
| | | | | 417/559 |
| 2008/0224417 | A1 | 9/2008 | Benson et al. | |
| 2017/0058849 | A1 | 3/2017 | Marsden et al. | |
| 2018/0017030 | A1 | 1/2018 | Laity et al. | |

FOREIGN PATENT DOCUMENTS

| | | | |
|---|---|---|---|
| JP | 57148053 | A | 9/1982 |
| JP | 2010229924 | A | 10/2010 |
| KR | 1020120045270 | A | 5/2012 |

\* cited by examiner

HIGH PRESSURE FUEL PUMP

CROSS REFERENCE TO RELATED APPLICATIONS

This application is a national stage application under 35 USC 371 of PCT Application No. PCT/EP2017/059417 having an international filing date of Apr. 20, 2017, which is designated in the United States and which claimed the benefit of GB Patent Application No. 1607312.4 filed on Apr. 27, 2016, the entire disclosures of each are hereby incorporated by reference in their entirety.

TECHNICAL FIELD

The present invention relates to a cam actuated high pressure pump and more particularly to a plunger arrangement limiting fuel leaks.

BACKGROUND OF THE INVENTION

A diesel internal combustion engine (ICE) comprises a fuel injection equipment wherein fuel sucked in a low pressure tank is pressurized at 2000 bars or higher in a cam actuated high pressure pump, prior to be delivered to a high pressure reservoir, or common rail, to which are connected a plurality of fuel injectors. A command unit controls the equipment as a function of the demand of fuel from the ICE.

In the high pressure pump, fuel is pressurized in a compression chamber defined between the head end of a plunger and the blind end of a bore. The plunger reciprocates in the bore therein performing a pumping cycle during which the inner volume of the compression chamber is varied. As said volume reduces, part of the fuel, instead of being pressurized, leaks between the plunger and the bore through a clearance that enlarges as the pressure in the chamber rises.

To limit or reduce said leaks to the minimum acceptable still enabling plunger to bore lubrication several solutions have been tested such as plungers provided with a recess opening on their head end. In operation the recess is filled with fuel and, when the pressure rises the peripheral wall of the recess slightly expands and closes, at least partially, the clearance.

Unfortunately, the recess augments the quantity of pressurized fuel in said volume then, the pressure of said volume alternatively rises and drops, this representing important volumetric loss.

SUMMARY OF THE INVENTION

Accordingly, it is an object of the present invention to resolve the above mentioned problems in providing a high pressure fuel pump having a pumping head wherein a compression chamber is defined between the blind end of a bore and the head end of a plunger slidably adjusted in said bore and adapted to perform therein a pumping cycle varying the volume of said compression chamber.

The pump is further provided with inlet and outlet valve assemblies for controlling fuel flowing in and out of said compression chamber.

Advantageously, the plunger is provided with a blind bore defining a chamber open in the head end of the plunger and being in fluid communication with the compression chamber. The end face of the plunger is limited to a peripheral annular face surrounding said opening. Said bore further defines a peripheral cylindrical wall and a bottom face and wherein, a filler member is arranged inside said chamber.

The filler member has a slightly narrower section than the inner diameter of the bore so that, an annular gap is defined between the filler member and the inner face of the cylindrical wall of the blind bore.

Said gap is smaller than 20 µm, preferably around 10 µm to the radius.

Also, the filler member is made of low density material.

In particular, the filler member is made of aluminum or of an inert polymer or of ceramic material.

More precisely, the filler member is unfixed to the plunger, the filler member being free to move inside the chamber.

Also, the space between the blind bore and the filler member is filled with fuel.

The filler member has a height slightly smaller than the depth of the blind bore so that, when the filler member is inside the chamber. The upper face of the filler member is in flush surface continuity with the top peripheral annular face of the plunger defining a bottom clearance between the under face of the filler member and the bottom face of the bore.

BRIEF DESCRIPTION OF THE DRAWINGS

The present invention is now described by way of example with reference to the accompanying drawings in which.

DESCRIPTION OF THE PREFERRED EMBODIMENTS

Figure 1:
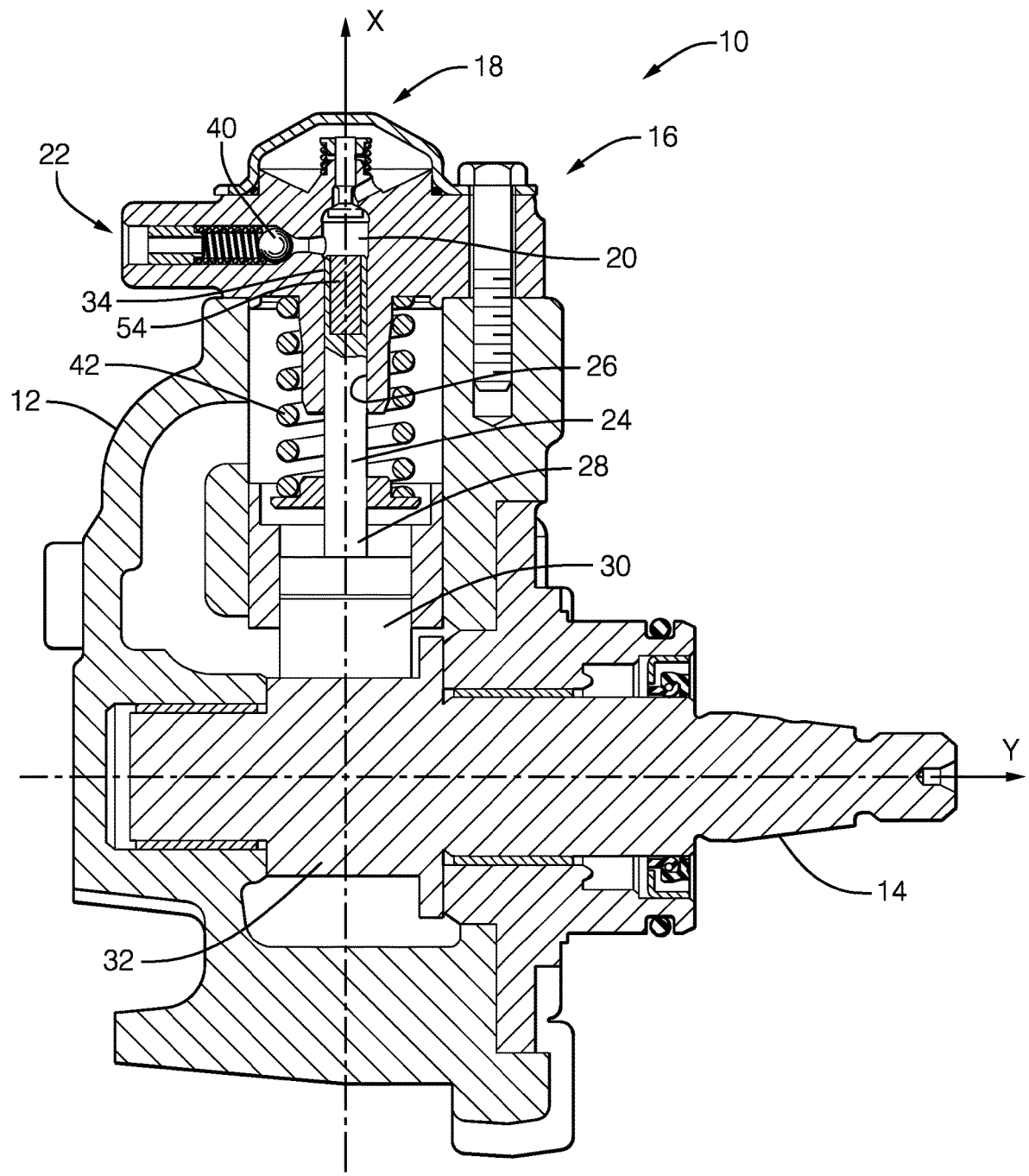
FIG. 1 is a general section of a high pressure pump as per the invention.

In reference to FIG. 1 is described a high pressure fuel pump 10 adapted to be arranged in a diesel fuel injection equipment not represented. The pump 10 comprises a body 12 wherein a camshaft 14 arranged between two bearings is adapted to rotate about a cam axis Y. On the body 12 is fixedly arranged a pumping head 16 wherein fuel entering via an inlet 18 in a compression chamber 20 exits after being pressurized via an outlet 22.

In use, fuel compression occurs during a pumping cycle wherein a plunger 24 reciprocally slides in a bore 26 of the pumping head 16 between a bottom dead centre (BDC) position and a top dead centre (TDC) position. A functional annular clearance C1 is kept between the plunger 24 and the bore 26 to ensure sliding and lubrication of the plunger. The plunger 24 extends along a pumping axis X, perpendicular to the cam axis Y, from a low pressure end 28 protruding outward the pumping head 16 and cooperating via a cam follower 30 with a cam 32 of the camshaft 14, to a high pressure end 34 that is inside the bore and which extreme transverse face 36, or top face 36 of the plunger, partly defines the compression chamber 20.

The inlet 18 in controlled by an inlet valve member 38 arranged at the end of the bore 26 and, the outlet 22 radially arranged relative to the compression chamber 20 in controlled by an outlet valve member 40. In the representation of FIG. 1 the outlet valve member 40 is a check valve with a ball biased by a coil spring in a closed position against a conical seating face. The pump represented on FIG. 1 is chosen as a non-limiting example and, in alternative embodiments the inlet and outlet channels are arranged differently for instance both being parallel, or slightly angled, to the plunger axis.

The compression chamber 20 is the space fully defined between said extreme transverse face 36 of the plunger, the cylindrical lateral face of the bore and the under face of the inlet valve member 38 or, in alternative embodiments the transverse end face of the bore. As visible on FIG. 2 the short drilling between the pumping chamber and the outlet ball valve seat is also part of the pressurized volume.

Finally a pump spring 42 compressed between the pumping head 16 and the a spring seat fitted with the plunger, the plunger 24 pushing the cam follower 30 toward BDC against the cam 32.

In use, when the camshaft 14 rotates, the cam 32 imparts to the plunger 24 said reciprocating movement performing said pumping cycle during which the inner volume of the compression chamber 20 is varied.

Figure 2:
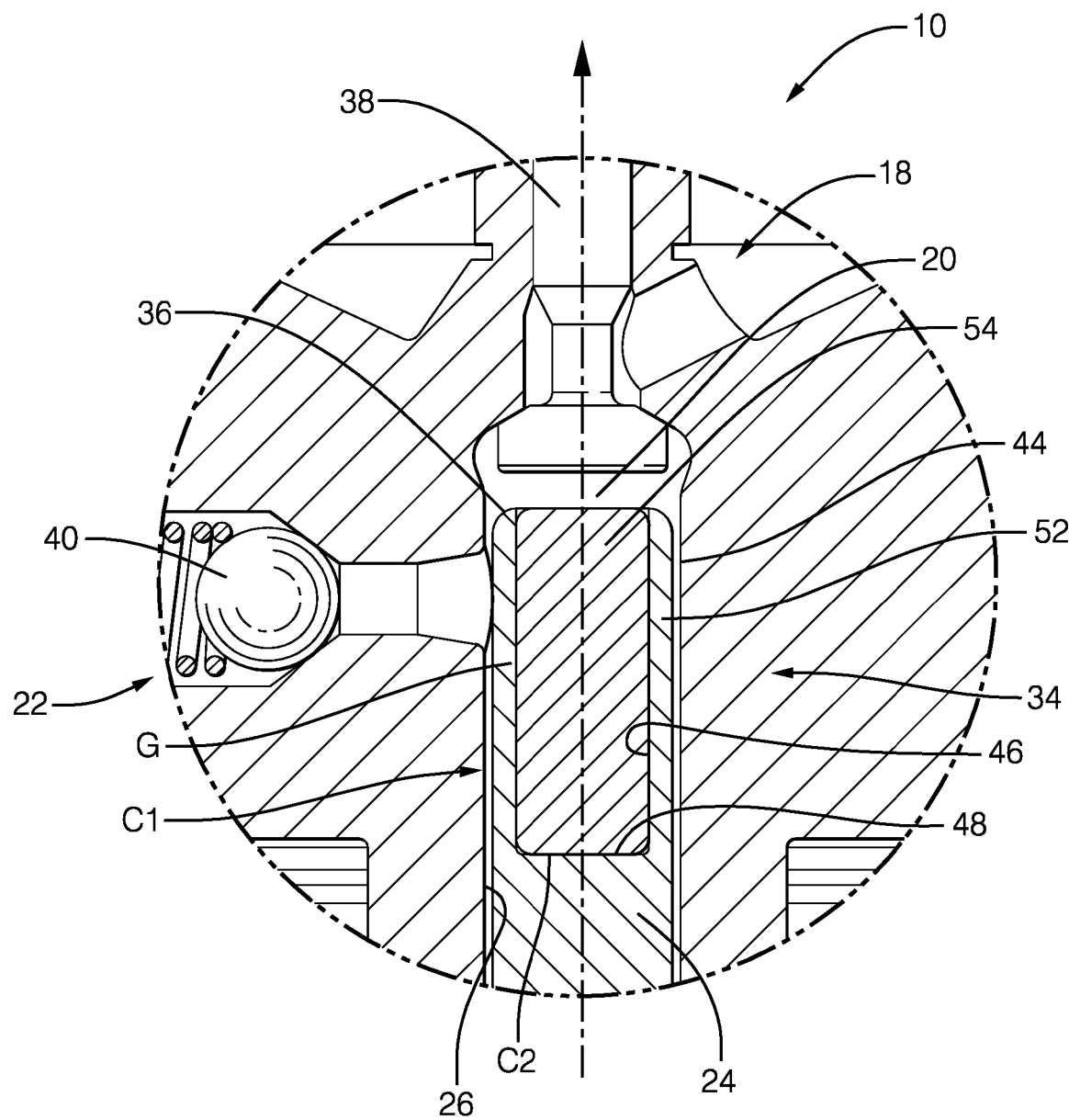
FIG. 2 is magnified portion of the compression chamber of the pump of FIG. 1.
Figure 3:
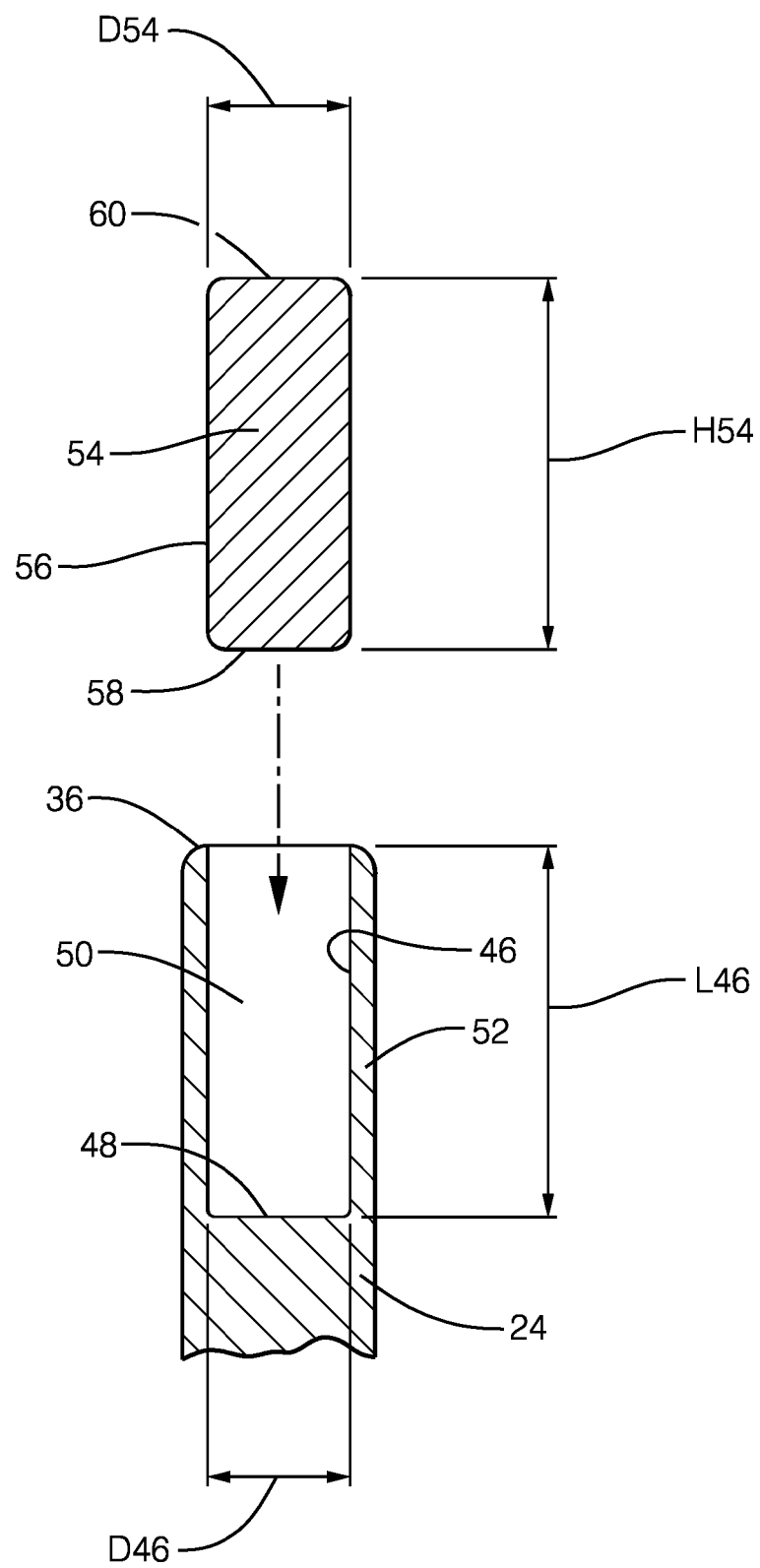
FIG. 3 is a further magnified view of the plunger of the pump of FIG. 1.

The region of the compression chamber 20 now detailed in reference to FIGS. 2 and 3 shows that the outlet 22 radially opens in the final portion 44 of the bore and that the high pressure end 34 of the plunger, when in TDC, extends in said enlarged final portion 44. In order to avoid closing the outlet 22 with the plunger 24, said final portion 44 of the bore has a slightly enlarged section.

Also, the plunger 24 is provided on its high pressure end 34 with a deep recess forming a cylindrical blind bore 46 axially X extending inside the plunger from the top face 36 toward a bottom face 48. The blind bore 46 has a diameter D46 and a length L46, or depth L46, said bore 46 defining an open chamber 50 limited by a peripheral cylindrical wall 52 and the bottom face 48. The chamber 50 is open at the very top of the plunger and therefore the top face 36 of the plunger is limited to the peripheral annular face surrounding the opening of the inner bore 46 in the compression chamber 20.

Inside the inner bore 46 is arranged a filler member 54 having a cylindrical outer face 56 of diameter D54, slightly smaller than the diameter D46 of the bore and, a height H54 slightly smaller than the depth L46 of the bore, the filler member 54 extending from an under face 58 to a upper face 60. In place in the chamber 50, said dimensions D54, H54, being slightly smaller than the corresponding dimensions of the chamber, define an annular gap G between the cylindrical outer face 56 of the filler member and the cylindrical peripheral wall 52 of the bore and, a bottom clearance C2 between the under face 58 of the filler member and the bottom face 48 of the bore, the upper face 60 of the filler member being substantially in flush surface continuity with the top annular face 36 of the plunger. There may be a small, fluid-filled clearance C2, but it is not essential to the design. Ideally, height H54 is equal to or slightly smaller than depth L46 of the bore but, provided the filler member 54 does not interfere with the inlet valve at TDC, then it would be feasible to make the height H54 greater than the depth L46.

In use, said gap G and said bottom clearance C2 are filled with fuel and, to ensure this filling, the chamber 50 is first filled with fuel then, the filler member is inserted in the bore thus evacuating the fuel via the gap G and ensuring that no air is retained under the filler member and that, when fully inserted, the bottom clearance C2 is filled with fuel and no air remains captured therein.

It is to be noted that the filler member 54 is not fixed or attached by any means to the plunger. The filler member 54 is therein free to move.

In use, when the plunger 24 reciprocates, the fuel captured in the gap G and in the bottom clearance C2 keep the filler member 54 inside the chamber. Said fuel acts as a suction pad retaining the filler member 54 in place. Furthermore, the high pressure generated in the compression chamber 20 applies on the upper face 60 of the filler member a force that contributes to its positioning inside the chamber 50. To further ease said retention into the chamber 50, the filler member 54 is made of a light material such as aluminum, or ceramic, or even an inert polymer such as PEEK, the weight of the filler member being minimized it reduces the inertia of the filler member and, when the plunger reverses its axial movement, around TDC, the suction of the fuel in the bottom clearance C2 and the pressure force on the upper face 60 overcome the inertia force of the filler member that tends to extract the filler member from the inner bore 46 and, consequently, the filler member remains in the chamber 50.

Also, the pressure in the compression chamber 20 is transmitted to the fuel in the gap G and consequently, the peripheral wall 52 of the bore expands when the plunger approaches TDC, said outwardly radial expansion of the wall 52 partially closing the functional sliding clearance C1 around the plunger and prevents increase of fuel leakage between the plunger 24 and the bore 26.

Tests have been successfully performed with filler members 54 made out of aluminum. The bottom clearance C2 was smaller than 20 μm and, the gap G was less than 20 μm to the diameter, or 10 μm to the radius. Plunger diameter was 6.5 mm and, a range of bore sizes from 3.5 to 5.1 mm, giving a minimum wall thickness of 0.7 mm. The depth L46 was approximately 8 mm Also, on the figures the filler member 54 has rounded edges but alternative geometries such as chamfers or sharp edges are possible.

LIST OF REFERENCES

X pumping axis
Y cam axis
BDC bottom dead centre position
TDC top dead centre position
D46 diameter of the inner bore
L46 length/depth of the bore
D54 diameter of the filler member
H54 length/height of the filler member
C1 functional clearance
G gap
C2 bottom clearance
10 pump
12 pump body
14 camshaft
16 pumping head
18 inlet
20 compression chamber
22 outlet
24 plunger
26 bore
28 low pressure end of the plunger
30 cam follower
32 cam
34 high pressure end of the plunger
36 transverse face-top face
38 inlet valve member
40 outlet valve member
42 pump spring
44 final enlarged portion of the bore
46 inner blind bore-deep recess 48 bottom face
50 chamber
52 peripheral wall
54 filler member
56 outer face
58 under face of the filler member
60 upper face of the filler member

The invention claimed is:

1. A high pressure fuel pump comprising:
  a pumping head wherein a compression chamber is defined between a blind end of a bore and a head end of a plunger which is slidably adjusted in said bore and adapted to perform therein a pumping cycle varying a volume of said compression chamber;
  an inlet valve assembly which controls fuel flowing into said compression chamber;
  an outlet valve assembly which controls fuel flowing out of said compression chamber;
  wherein said plunger is provided with a blind bore defining a chamber open in said head end of said plunger and being in fluid communication with said compression chamber, said end face of said plunger being limited to a peripheral annular face surrounding said blind bore, said blind bore further defining a peripheral cylindrical wall and a bottom face; and
wherein a filler member is arranged inside said chamber open in said head end of said plunger;
  wherein said filler member has a narrower section than an inner diameter of said blind bore so that an annular gap is defined between said filler member and said peripheral cylindrical wall of said blind bore; and
  wherein said annular gap is smaller than 20 μm diametrically.

2. A high pressure fuel pump comprising:
  a pumping head wherein a compression chamber is defined between a blind end of a bore and a head end of a plunger which is slidably adjusted in said bore and adapted to perform therein a pumping cycle varying a volume of said compression chamber;
  an inlet valve assembly which controls fuel flowing into said compression chamber;
  an outlet valve assembly which controls fuel flowing out of said compression chamber;
  wherein said plunger is provided with a blind bore defining a chamber open in said head end of said plunger and being in fluid communication with said compression chamber, said end face of said plunger being limited to a peripheral annular face surrounding said blind bore, said blind bore further defining a peripheral cylindrical wall and a bottom face; and
wherein a filler member is arranged inside said chamber open in said head end of said plunger;
  wherein said filler member has a narrower section than an inner diameter of said blind bore so that an annular gap is defined between said filler member and said peripheral cylindrical wall of said blind bore;
  wherein said gap between said filler member and said peripheral cylindrical wall of said blind bore is filled with fuel;
  wherein said filler member has a height which is smaller than a depth of said blind bore so that, when said filler member is inside said chamber open in said head end of said plunger, an upper face of said filler member is in flush surface continuity with said peripheral annular face of said plunger defining a bottom clearance between an under face of said filler member and said bottom face of said blind bore.

3. A high pressure fuel pump as claimed claim 2, wherein said filler member is made of low density material.

4. A high pressure fuel pump as claimed in claim 3, wherein said filler member is made of aluminium or of an inert polymer or of ceramic material.

5. A high pressure fuel pump as claimed in claim 2, wherein said filler member is unfixed to said plunger, said filler member being free to move inside said chamber open in said head end of said plunger.

6. A high pressure fuel pump as claimed in claim 2, wherein said annular gap is smaller than 20 μm diametrically.

7. A high pressure fuel pump comprising:
  a pumping head wherein a compression chamber is defined between a blind end of a bore and a head end of a plunger which is slidably adjusted in said bore and adapted to perform therein a pumping cycle varying a volume of said compression chamber;
  an inlet valve assembly which controls fuel flowing into said compression chamber;
  an outlet valve assembly which controls fuel flowing out of said compression chamber;
  wherein said plunger is provided with a blind bore defining a chamber open in said head end of said plunger and being in fluid communication with said compression chamber, said end face of said plunger being limited to a peripheral annular face surrounding said blind bore, said blind bore further defining a peripheral cylindrical wall and a bottom face; and
wherein a filler member is arranged inside said chamber open in said head end of said plunger;
  wherein said filler member has a narrower section than an inner diameter of said blind bore so that an annular gap is defined between said filler member and said peripheral cylindrical wall of said blind bore;
  wherein said filler member has a height which is smaller than a depth of said blind bore so that, when said filler member is inside said chamber open in said head end of said plunger, an upper face of said filler member is in flush surface continuity with said peripheral annular face of said plunger defining a bottom clearance between an under face of said filler member and said bottom face of said blind bore.

* * * * *